(12) United States Patent
Flockhart et al.

(10) Patent No.: US 7,500,241 B1
(45) Date of Patent: Mar. 3, 2009

(54) METHOD AND APPARATUS FOR SCHEDULING TASKS

(75) Inventors: Andrew D. Flockhart, Thornton, CO (US); Larry John Roybal, Westminster, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 977 days.

(21) Appl. No.: 10/683,039

(22) Filed: Oct. 10, 2003

(51) Int. Cl.
*G06F 9/46* (2006.01)

(52) U.S. Cl. ........................ 718/102; 718/100

(58) Field of Classification Search .............. 718/1–108
See application file for complete search history.

(56) References Cited

U.S. PATENT DOCUMENTS

| | | | | |
|---|---|---|---|---|
| 4,048,452 | A * | 9/1977 | Oehring et al. | 379/111 |
| 4,403,286 | A * | 9/1983 | Fry et al. | 718/105 |
| 4,466,098 | A | 8/1984 | Southard | |
| 4,625,308 | A * | 11/1986 | Kim et al. | 370/321 |
| 4,633,039 | A | 12/1986 | Holden | |
| 4,700,292 | A | 10/1987 | Campanini | |
| 4,737,983 | A | 4/1988 | Frauenthal et al. | |
| 4,757,529 | A | 7/1988 | Glapa et al. | |
| 4,839,798 | A * | 6/1989 | Eguchi et al. | 718/105 |
| 4,893,301 | A | 1/1990 | Andrews et al. | |
| 5,073,893 | A | 12/1991 | Kondou | |
| 5,212,793 | A * | 5/1993 | Donica et al. | 718/105 |
| 5,214,692 | A | 5/1993 | Chack et al. | |
| 5,278,898 | A | 1/1994 | Cambray et al. | |
| 5,309,513 | A | 5/1994 | Rose | |
| 5,369,695 | A | 11/1994 | Chakravarti et al. | |
| 5,442,730 | A * | 8/1995 | Bigus | 706/19 |
| 5,469,503 | A | 11/1995 | Butensky et al. | |
| 5,524,147 | A | 6/1996 | Bean | |
| 5,793,747 | A * | 8/1998 | Kline | 370/230 |
| 6,083,280 | A * | 7/2000 | Eitel | 717/158 |
| 6,260,126 | B1 * | 7/2001 | Harris | 711/167 |
| 6,665,716 | B1 * | 12/2003 | Hirata et al. | 709/224 |
| 6,757,897 | B1 * | 6/2004 | Shi et al. | 718/102 |
| 6,810,503 | B1 * | 10/2004 | David et al. | 715/500.1 |
| 6,904,470 | B1 * | 6/2005 | Ofer et al. | 710/6 |
| 6,961,689 | B1 * | 11/2005 | Greenberg | 703/17 |

(Continued)

OTHER PUBLICATIONS

*Definity® Enterprise Communications Server Release 9.5 Guide to ACD Call Centers*, Avaya Communications, 555-233-506, Issue 4 (Jul. 2001), pp. 9-13.

(Continued)

*Primary Examiner*—Meng-Ai An
*Assistant Examiner*—Abdullah Al Kawsar
(74) *Attorney, Agent, or Firm*—Sheridan Ross P.C.

(57) ABSTRACT

A scheduler system for use in connection with a resource allocation system is provided. According to the present invention, a plurality of queues are provided for scheduling the delivery of tasks or events to a resource. Each of the provided queues may have a different threshold time, allowing the queues to be segmented according to the time values of included tasks. In accordance with an embodiment of the present invention, a primary queue comprising a delta queue is provided for tasks that are to be performed during a first period of time, while one or more secondary scheduler queues are provided for tasks that are scheduled to be performed after the first period of time.

16 Claims, 7 Drawing Sheets

U.S. PATENT DOCUMENTS

| | | | | |
|---|---|---|---|---|
| 6,976,072 B2 * | 12/2005 | Mathieson | ............... | 709/224 |
| 6,993,762 B1 * | 1/2006 | Pierre | ............... | 718/102 |
| 7,028,297 B2 * | 4/2006 | Horn et al. | ............... | 718/100 |
| 7,085,229 B1 * | 8/2006 | Potter et al. | ............... | 370/231 |
| 7,093,259 B2 * | 8/2006 | Pulsipher et al. | ............... | 718/106 |
| 2002/0073129 A1 * | 6/2002 | Wang et al. | ............... | 709/102 |
| 2003/0095447 A1 * | 5/2003 | Dean | ............... | 365/200 |
| 2008/0091308 A1 * | 4/2008 | Henson et al. | ............... | 700/293 |

OTHER PUBLICATIONS

*Communication Manager Call Vectoring and EAS Guide*, Avaya Communications, Issue 1.0 (Nov. 2003), pp. 21-28, 277-304.

Brochure entitled "Avaya Call Center," Avaya Inc. (2004), 5 pages.

Brochure entitled, "Avaya Media Servers and Avaya Media Gateways," Avaya Inc. (2004).

Phelps, Kay, "The IP Contact Center," *Avaya White Paper* (Oct. 2001), pp. 1-11.

*Avaya MultiVantage™ Software on Avaya S8700 Media Server, Avaya S8300 Media Server, Avaya Definity Server R, Avaya Defnity Server SI and Avaya Definity Server CSI*, Avaya Release 1.1.2, 555-233-423, Issue 1 (Aug. 2002), pp. 1-33.

*Overview of the Avaya G350 Media Gateway*, Avaya Communications (Jun. 2004), pp. 25-33, 41.

*Installation and Upgrades for G700 with S8300 and S8700*, Avaya Communications, 555-234-100, Issue 3 (May 2003), p. 124.

*Installing the Avaya S8500 Media Server with an Avaya G650 Media Gateway*, Avaya Communications (Dec. 2003), pp. 97, 103-5, 124.

* cited by examiner

METHOD AND APPARATUS FOR SCHEDULING TASKS

FIELD OF THE INVENTION

The present invention is related to scheduling tasks in connection with resource allocation systems. In particular, the present invention provides a primary queue in combination with one or more secondary queues in order to maintain a schedule of tasks.

BACKGROUND OF THE INVENTION

Resource allocation systems, such as may be found in computer systems, call centers, contact centers, automated business process systems and other systems that provide resources for performing tasks require that such tasks be scheduled. As the number of tasks scheduled for completion by a resource allocation system increases, the accompanying growth in the number of scheduled tasks becomes an increasing burden on the resource allocation system. This burden is exacerbated by algorithms in which a significant number of scheduled tasks are canceled and rescheduled.

In general, the cost of canceling a task is minimal. However, the cost of reinserting a rescheduled task into a scheduling queue becomes exorbitant where a large number of scheduled tasks are maintained by a scheduler. In order to provide for simple insertion of a newly received or rescheduled task, an array based scheduler may be used. In an array based scheduler, a list of timers is maintained, in which each timer relates to the time for performance of a scheduled task. When a task is inserted into an array based scheduler, it may simply be appended to the list of timers already included in the array. Cancellation of a scheduled task from an array based scheduler simply requires deletion of the timer associated with the canceled task. However, each item in an array based scheduler must typically be scanned in order to locate the next timer to expire, and thus the next task to be performed.

In order to simplify identifying a next task to be performed, a delta queue based scheduler may be used. In a delta queue based scheduler, scheduled items are maintained in time order. In particular, the delta between succeeding items in the queue are calculated and maintained. Accordingly, by referencing the delta, the time to the next scheduled event is apparent. However, when a new or reinserted item is placed in a delta queue, a significant portion of the delta queue must be scanned in order to find the proper insertion point for the item. In addition, the delta between the newly inserted item and the preceding item must be calculated, as must the delta between the newly inserted item and any succeeding items.

Accordingly, while scheduling arrays require few processing resources in connection with adding new tasks or canceling previously scheduled tasks, they are relatively processor resource intensive in connection with identifying a next task for delivery to a resource. Conversely, while a delta queue scheduler is relative processor resource intensive in connection with the addition of a new task or cancellation of a scheduled task, delta queue schedulers require relatively few processor resources in connection with identifying a next task for delivery to a resource. Accordingly, designers of resource allocation systems have been required to choose from either an array based scheduler or a delta based scheduler based on a prediction as to which type of scheduler would provide the greatest efficiency in connection with a particular resource allocation system.

SUMMARY OF THE INVENTION

The present invention is directed to solving these and other problems and disadvantages of the prior art. In accordance with an embodiment of the present invention, a scheduler is provided in which a primary queue is used in combination with one or more secondary queues. In accordance with an embodiment of the present invention, tasks that are scheduled for completion within a first time period are placed in a primary scheduler queue comprising a delta queue while tasks having a scheduled time for completion that is greater than the first period are placed in a secondary scheduler queue comprising a scheduling array.

In accordance with another embodiment of the present invention, a delta queue scheduler is combined with a plurality of array based schedulers. In accordance with such an embodiment, the delta queue scheduler is used to maintain a list of tasks that are scheduled for delivery to a resource within a first period of time. A first of the plurality of array based schedulers is used to maintain items that are scheduled for delivery to the resource at a time falling between the first period of time and a second period of time. A second array based scheduler maintains a list of tasks that are scheduled for delivery to the resource at a time that is greater than the second period of time. By providing multiple array based schedulers, the number of tasks within any one array based scheduler that must be scanned in order to identify the next task that is to be sent to the delta queue or to a next array can be reduced.

In accordance with a further embodiment of the present invention, the time at which the next item in an array is scheduled for delivery to a resource is maintained in a register. According to such an embodiment, reference to the register can be made to determine whether the array must be scanned in order to locate and deliver a task to a next array or to the delta queue. Furthermore, the use of a register to maintain a record of the time until the next task in the array is to be delivered to a next array or to the delta queue removes the need to continually update the time value maintained for each individual task included in the array. In particular, the time value for each task in the array need only be updated when a task is delivered to a next array or to the delta queue.

DETAILED DESCRIPTION

Figure 1:
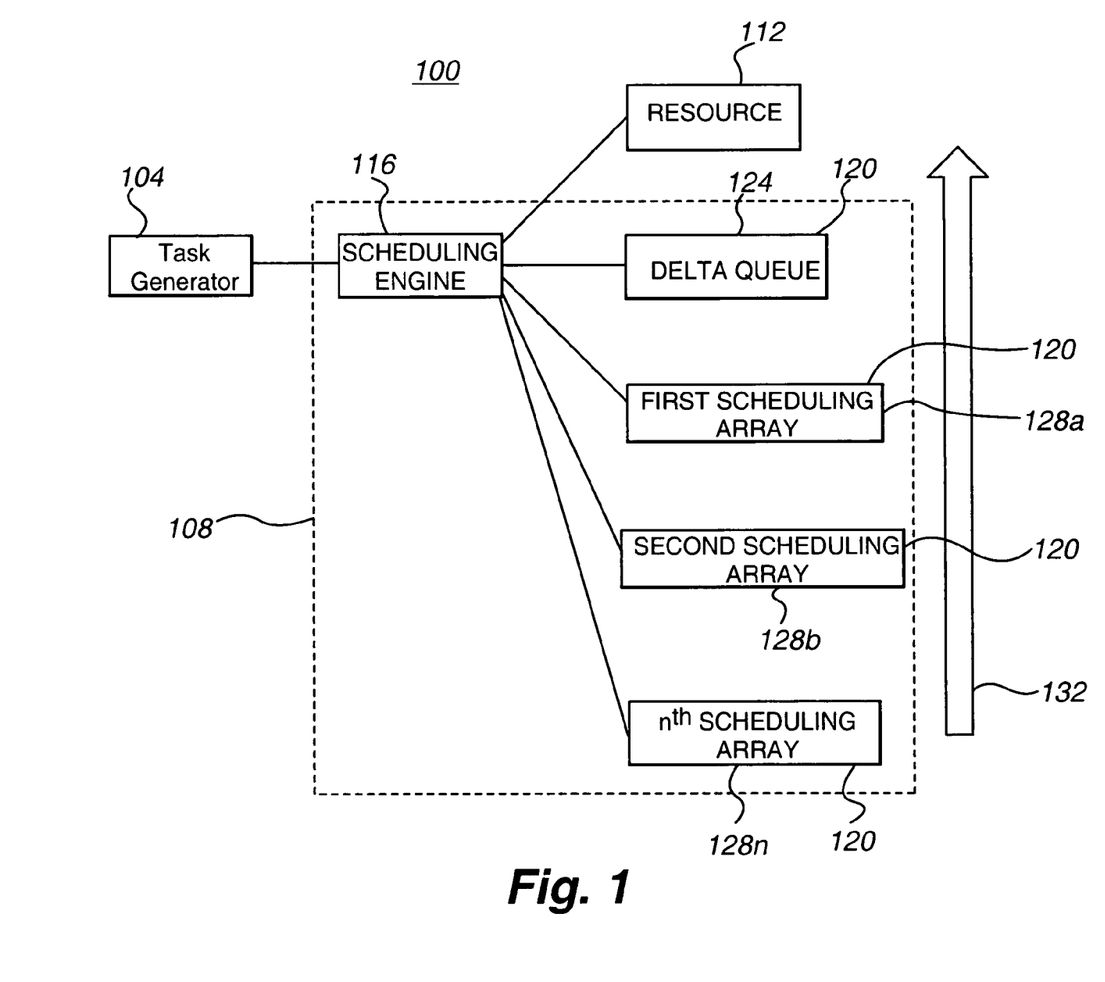
FIG. 1 is a functional block diagram of a resource allocation system in accordance with an embodiment of the present invention.

With reference now to FIG. 1, functional aspects of a resource allocation system 100 are illustrated. In general, the resource allocation system 100 includes a task generator 104, a scheduler system 108, and a resource 112. The task generator 104 comprises a source of tasks or events that are each associated with a time for completion. The scheduler system 108 functions to queue the tasks, and deliver them to the resource 112 for service at the scheduled time. In addition, the scheduler system 108 accommodates requests to delete or reschedule queued tasks.

The scheduler system 108 generally includes a scheduling engine 116 and a plurality of scheduler queues 120. The scheduler queues 120 include at least one primary queue 124. As illustrated in FIG. 1, the primary queue 124 may comprise a delta queue. In addition, the scheduler queues 120 include one or more secondary scheduler queues 128. For example, as illustrated in FIG. 1, a scheduler system 108 may comprise 1 to n secondary arrays, illustrated in FIG. 1 as scheduling arrays 128a, 128b and 128n. Furthermore, the secondary scheduler queues 128 may comprise scheduling arrays. As will be described in greater detail elsewhere herein, arrow 132 generally depicts the progression of an event through the various scheduler queues 120 provided as part of a scheduler system 108, until the event is delivered to the resource 112.

As can be appreciated by one of skill in the art, the resource allocation system 100 can comprise any system in which the scheduling of events received from a source (depicted as task generator 104 in FIG. 1) for service by one or more resources 112 is desirable. Accordingly, the resource allocation system 100 may comprise a computer system or network. As a further example, the resource allocation system 100 may comprise a call or contact center. As can also be appreciated by one of skill in the art, the events or tasks may be associated with scheduled times ranging from extremely brief time periods (e.g., measured in milliseconds) to long time segments (e.g., days or even years). Furthermore, a resource allocation system 100 in accordance with an embodiment of the present invention can efficiently queue events having associated times ranging from extremely short time periods to very long time periods.

Figure 2:
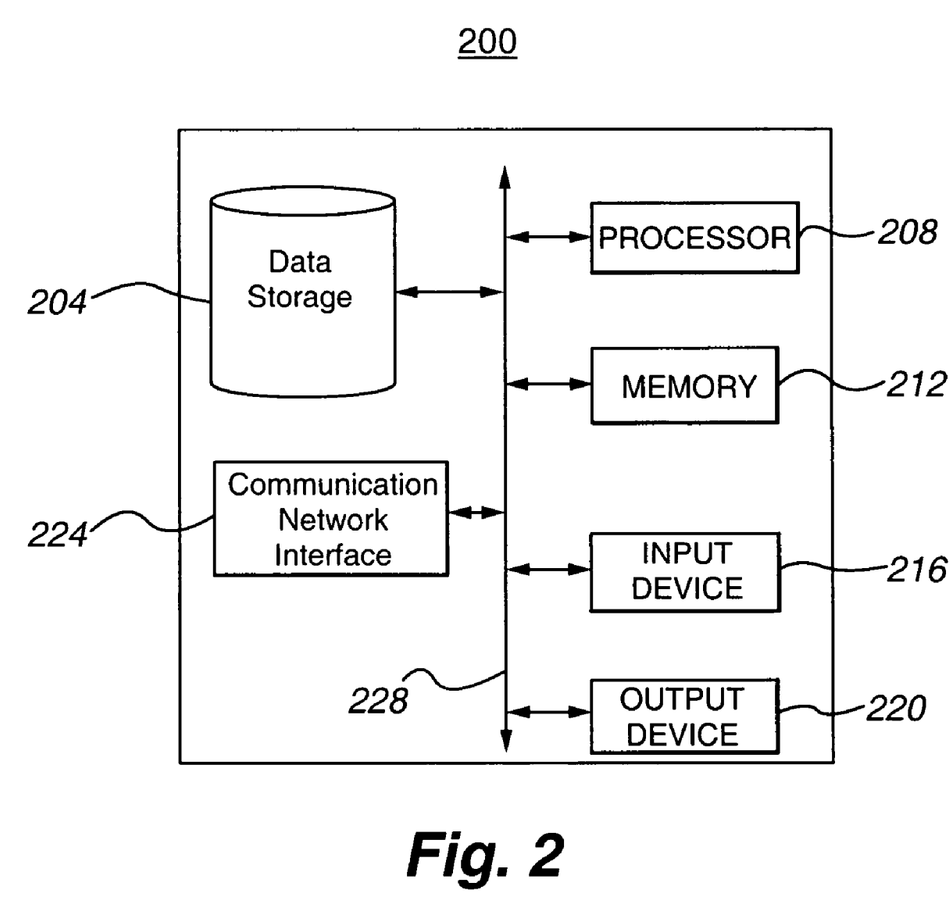
FIG. 2 is a block diagram of a computer that may be used in connection with an embodiment of the present invention.

With reference now to FIG. 2, a general purpose computer 200 such as may be used in connection with the implementation of a resource allocation system 100 or scheduler system 108 is illustrated. In general, the computer 200 may include data storage 204 for storing operating instructions and/or data. For example, the data storage 204 may provide storage for application programming implementing a scheduler system 108 and associated scheduler queues 120 in accordance with the present invention. The data storage 204 may include magnetic storage devices, solid state storage devices, optical storage devices, logic circuits, or any combination of such devices. In addition, the computer 200 may include a processor 208. The processor 208 may comprise a general purpose, programmable processor or digital signal processor, and may run application programs stored in the data storage 204 that implement the various functions of the resource allocation system 100 and/or scheduler system 108. For example, the processor 208 may comprise the functions of a task generator 104, the scheduler system 108, and/or a resource 112. Memory 212 may be provided for use in connection with the running of software by the processor 208. Furthermore, the memory 212 may comprise the physical structure in which the various scheduler queues 120 are implemented. The memory 212 may comprise solid state memory, as such as RAM, DRAM or SDRAM.

The computer 200 may additionally include various input devices 216, such as key boards and pointing devices. The computer 200 may also include an output device 220, such as a cathode ray tube, liquid crystal display, plasma display, or other visual output device. A communication network interface 224 may be provided to interconnect the computer 200 to one or more communication networks. For example, in an embodiment in which the computer 200 comprises a scheduler system 108 that is separate from the task generator 104 and/or the resource 112, tasks may be received from the task generator 104 and/or delivered to a resource 112 over a communication network or networks via the communication network interface 224. Accordingly, an example of a communication network interface 224 may include an Ethernet adaptor or other network adaptor. The computer 200 also generally includes a communication bus 228 to permit the exchange of data between the various components of the computer 200.

Figure 3A:
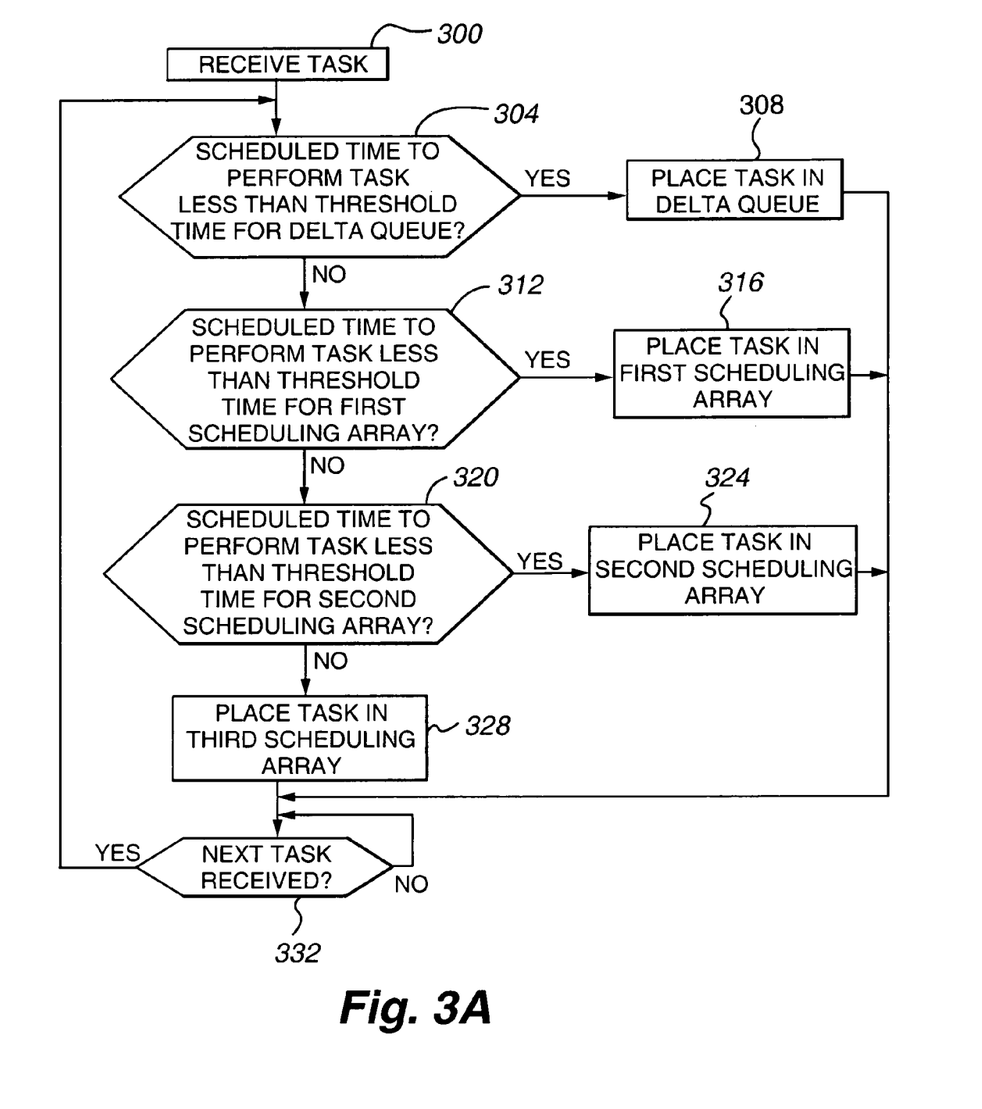
FIGS. 3A-3B are flowcharts depicting aspects of the operation of a scheduler system in accordance with an embodiment of the present invention.

With reference now to FIG. 3A, the operation of a scheduler system 108 in accordance with an embodiment of the present invention in receiving tasks for queuing is illustrated. Initially, at step 300, a task or event is received by the scheduler system 108 from a task generator 104. In general, the task or event is received from the task generator 104 with an associated time value. The time value indicates the time at which the task is scheduled to be delivered to a resource 112. In accordance with an embodiment of the present invention, the scheduled time is represented as a timer indicating the amount of time remaining until the task is to be delivered to the resource 112.

At step 304, a determination is made as to whether the scheduled time to perform the received task is less than the threshold for the primary scheduler queue 124, or delta queue. In general, embodiments of the present invention provide a primary scheduler queue 124 comprising a delta queue for queuing those tasks having a scheduled time that is less than the minimum scheduled time associated with any secondary scheduler queue 128. That is, the primary scheduler queue 124 is used to queue those tasks that are scheduled for delivery to a resource 112 before any of the tasks stored in any of the secondary scheduler queues 128. As can be appreciated by one of skill in the art, a primary scheduler queue comprising a delta queue 124 stores tasks in the order in which they are to be delivered to a resource. Therefore, the next task scheduled for delivery to the resource 112 can be immediately identified. Accordingly, an embodiment in which the primary scheduler queue 124 comprises a delta queue allows the next task scheduled for delivery to a resource 112 to be identified with a minimum of delay.

If the scheduled time to perform the task is less than the threshold time for the primary scheduler queue 124, that task is placed in the primary scheduler queue 124 (step 308). If the scheduled time to perform the task is not less than the threshold time for the primary scheduler queue 124, the system proceeds to step 312.

At step 312, a determination is made as to whether the scheduled time to perform the task is less than the threshold time for a first secondary scheduler queue 128. In accordance with an embodiment of the present invention, the first secondary scheduler queue 128 comprises a first scheduling array. As can be appreciated by one of skill in the art, an array based scheduler maintains a list of timers that are in the order that the associated tasks were received. Accordingly, tasks can be added to a scheduler array simply by appending a new task to the end of the array. Furthermore, a task can be removed from a scheduling array without requiring recalculation of timers associated with other tasks, or reordering of events remaining in the array. Accordingly, an array based scheduler queue provides certain advantages where tasks are likely to be rescheduled, because the insertion or removal of tasks from such an array requires relatively few processor 208 resources. Because tasks that are relatively far from their scheduled time for delivery to a resource 112 are more likely to undergo rescheduling than tasks that are near their scheduled time for delivery to a resource 112, the secondary scheduler queues 128 may comprise array based schedulers.

If at step 312 it is determined that the scheduled time to perform the task is less than the threshold time for the first secondary scheduler queue 128a, the task is placed in the first secondary scheduler queue 128a (step 316). If the scheduled time is not less than the threshold time for the first secondary scheduler queue 128a, the system proceeds to step 320.

At step 320, a determination is made as to whether the scheduled time to perform the task is less than the threshold time for a second secondary scheduler queue 128b. In general, the threshold time for the second secondary scheduler queue 128b is greater than the threshold time for the first secondary scheduler queue 128a. If the scheduled time to perform the task is less than the threshold time for the second secondary scheduler queue 128b, the task is placed in the second secondary scheduler queue 128b (step 324). If the scheduled time to perform the task is not less than the threshold time for the second secondary scheduler queue 128b, the task is placed in the third (or $n^{th}$) secondary scheduler queue 128' (step 328). As can be appreciated by one of skill in the art, the last secondary scheduler queue (e.g., secondary scheduler queue 128n) is not required to have an associated maximum threshold time.

At step 332, a determination is made as to whether a next task has been received by the scheduler system 108 from the task generator 104. If a next task has not been received, the scheduler system 108 may idle at step 332. Upon receiving a next task, the scheduler system 108 returns to step 304.

Figure 3B:
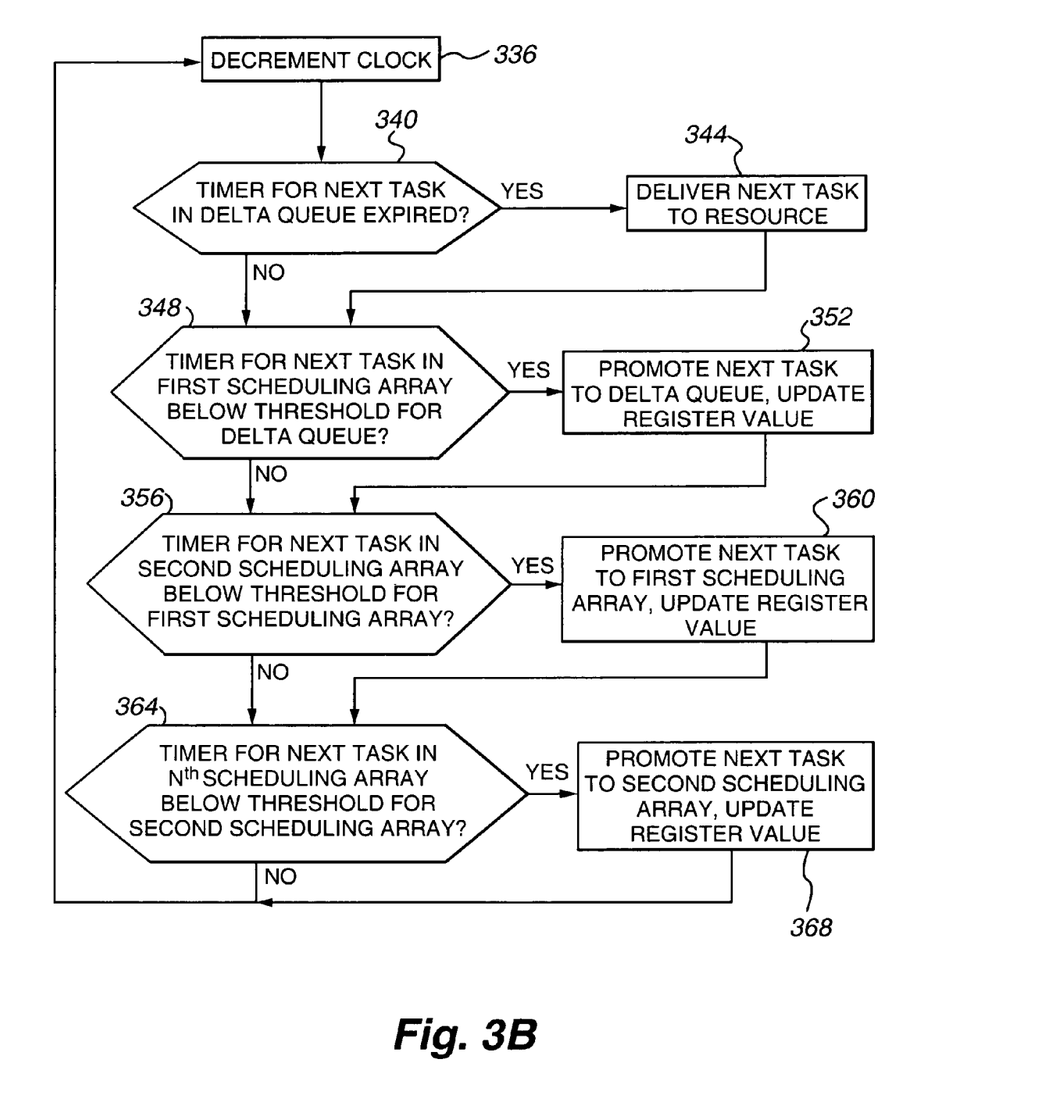

With reference now to FIG. 3B, the operation of a scheduler system 108 in accordance with an embodiment of the present invention in delivering tasks to a resource 112 is illustrated. Initially, at step 336, a system clock or timer is decremented. A determination is then made as to whether the timer associated with the next task in the delta queue 124 has expired (step 340). If the timer for the next task has expired, that task is delivered to the appropriate resource 112 (step 344).

If the timer for the next task in the delta queue 124 has not expired, or after the next task has been delivered to a resource 112, a determination is made as to whether the timer for the next scheduled task in the first scheduling array 128a is below the threshold time for the delta queue 124 (step 348). The determination as to whether the timer for the next task in the first scheduling array 128a is below that threshold can be made by referencing a register, for example maintained in memory 212, that holds the value of the next scheduled tasks included in the first scheduling array 128a. If the timer for the next task in the first scheduling array 128a is below the threshold for the delta queue 124, the first scheduling array 128a is scanned for the next task, the next task is promoted to the delta queue 124, and the register value is updated to contain the value of the task in the first scheduling array 128a that is next in line (step 352).

If the timer for the next task in the first scheduling array 128a is not below the threshold for the delta queue 124, or after the next task has been promoted to the delta queue 124, a determination is made as to whether a timer for the next task in the second scheduling array 128b is below the threshold for the first scheduling array 128a (step 356). As for the first scheduling array 128a, the determination as to whether the timer for the next task in the second scheduling array 128b has fallen below the threshold for the first scheduling array 128a can be made by referencing a register value containing a representation of the timer for the next task. If the timer value is below the threshold for the first scheduling array 128a, the second scheduling array 128b is scanned in order to locate the next task, and that task is promoted to the first scheduling array 128a (step 360). Also at step 360, the value held in the register associated with the scheduling array 128b is updated.

If the timer for the next task in the second scheduling array 128b is not below the threshold for the first scheduling array 128a, or after the next task has been promoted to the first scheduling array 128a, a determination is made as to whether the timer for a next task in the $n^{th}$ scheduling array 128n is below the threshold for the second scheduling array 128b (step 364). As with the other scheduling arrays 128, this determination may be made by referencing a value held by a register associated with the $n^{th}$ scheduling array 128n. If the timer for the next task in the $n^{th}$ scheduling array 128n is below the threshold for the second scheduling array 128b, the next task is promoted to the second scheduling array 128b, and the value held in the register associated with the $n^{th}$ scheduling array 128n is updated (step 368).

If the timer for the next task in the $n^{th}$ scheduling array 128n is not below the threshold for the second scheduling array 128b, or after the next task has been promoted to the second scheduling array 128b, the system may return to step 336. As can be appreciated by one of skill in the art, the steps described in connection with FIGS. 3A and 3B may be performed continuously while the scheduler system 108 is in operation.

As can be appreciated by one of skill in the art, the threshold times associated with the various scheduler queues 120 can be selected based on the characteristics of the resource allocation system 100 with which the scheduler system 108 is associated. For example, the threshold time setting a maximum time until a task or an event is scheduled to be delivered to a resource 112 from a primary scheduler queue 124 may be selected so that a number of tasks are usually maintained in the primary scheduler queue 124. In addition, the threshold associated with the primary scheduler queue 124 should be short enough that tasks are not often rescheduled when they are within that threshold time period of scheduled delivery to a resource 112. Such a scheduling system 108 can provide easy identification of events whose delivery to a resource 112 is imminent, while avoiding the need to consume processor 208 resources by continually reordering the primary scheduler queue 124. Furthermore, tasks that are more likely to be rescheduled are held within a secondary scheduler queue 128, which can comprise an array based scheduler, so that events can be deleted and rescheduled without requiring a large amount of processor 208 resources.

With reference now to FIGS. 4A-4J, the loading or population of queues 120 provided as part of a scheduler system 108 is depicted. In particular, with reference now to FIG. 4A, a series of events or tasks 404a-f are shown as they might be delivered to the scheduler system 108 by a task generator 104. In addition, memory locations 408 provided as a part of a primary scheduler queue 124, and in particular a primary schedule queue 124 comprising a delta queue are illustrated. In addition, memory locations 412 associated with a secondary scheduler queue 128, and in particular a secondary scheduler queue 128 comprising an array based scheduler are illustrated. A register 416 is also provided in connection with the secondary scheduler queue 128. In the example of FIGS. 4A-4J, the threshold time associated with the primary scheduler queue 124 is 1000. The units of the threshold and the time to perform a task may be in standard units of time, such as seconds or milliseconds, or in some other unit of time, such as processor 208 clock ticks.

Figure 4A:
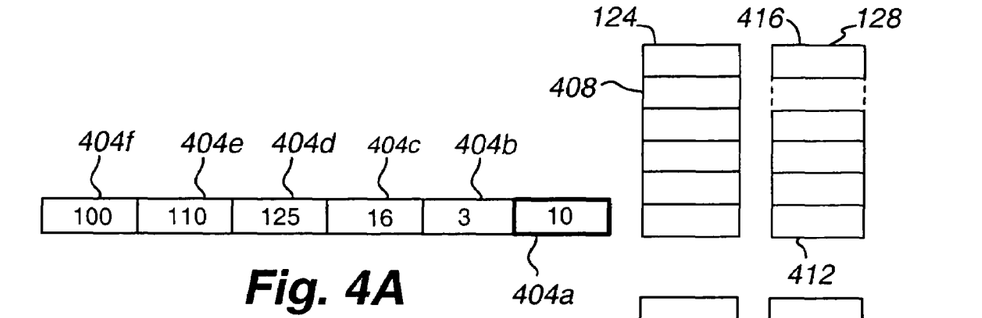
FIGS. 4A-4J illustrate the population of scheduler queues in accordance with an embodiment of the present invention.
Figures 4B, 4C, 4D:
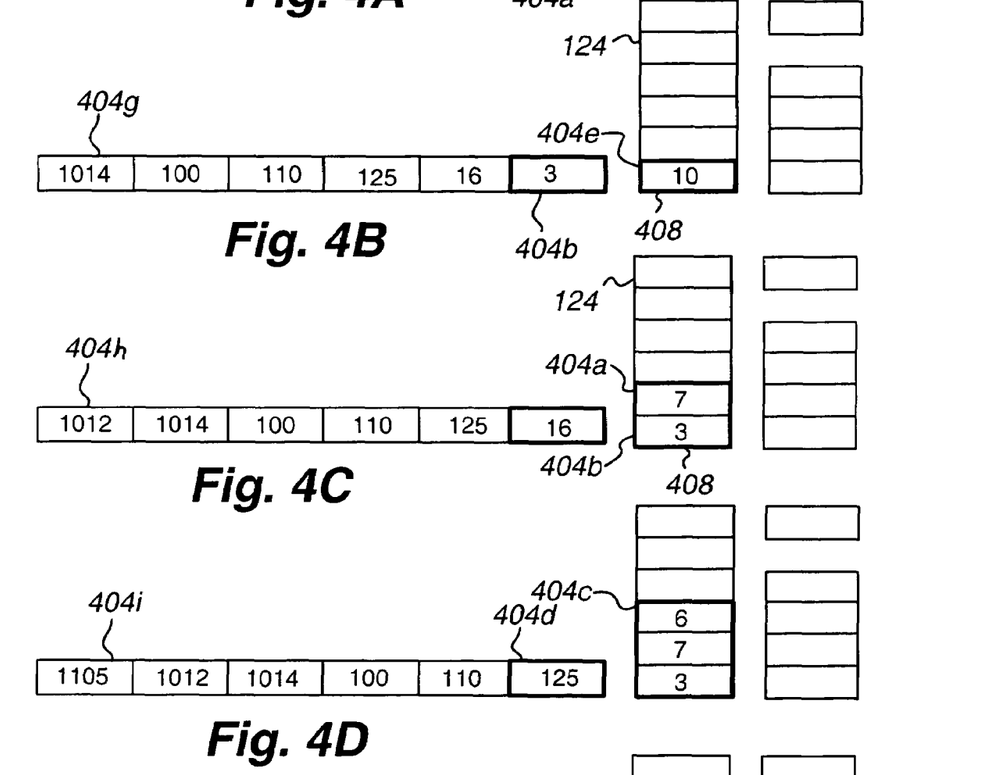

With reference now to FIG. 4B, the first task 404a is shown loaded into a memory location 408 provided as part of the primary scheduler queue 124. In particular, because the value of the first task 404*a* is 10, which is less than the threshold value of 1000 established for the primary scheduler queue 124 in the present example, the first event 404*a* is properly loaded into the primary scheduler queue 124. In FIG. 4B, a new event 404*g* is also shown in line to be queued by the scheduler system 108.

In FIG. 4C, the second event 404*b* is shown having been loaded into a memory location 408 of the primary scheduler queue 124. Because the primary scheduler queue 124 in the present example comprises a delta queue, the events 404 held within that queue 124 are maintained in the scheduled order. Furthermore, as shown by FIG. 4C, the next task or event to be delivered to a resource 112 is shown by that event's absolute time value, while tasks scheduled for delivery to a resource 112 at subsequent times are represented by the relative times at which they are scheduled for delivery to a resource 112. For example, the next scheduled task 404*b* is represented by its timer value "3" in the delta queue 124 while the following task 404*a*, which was represented by the value "10" in FIGS. 4A and 4B is represented by the value "7" in FIG. 4C, even though no time has elapsed between FIG. 4C and FIGS. 4A and 4B. FIG. 4C also illustrates a next scheduled task 404*h* in the line of tasks 404 waiting to be placed in a queue 120.

In FIG. 4D, the third task of 404*c* is shown having been placed in the delta queue 124. The value for the third task 404*c* maintained in the delta queue 124 is represented as the time from the preceding tasks scheduled time. FIG. 4D also illustrates a next task 404*i* waiting to be placed in a queue 120.

Figure 4E:
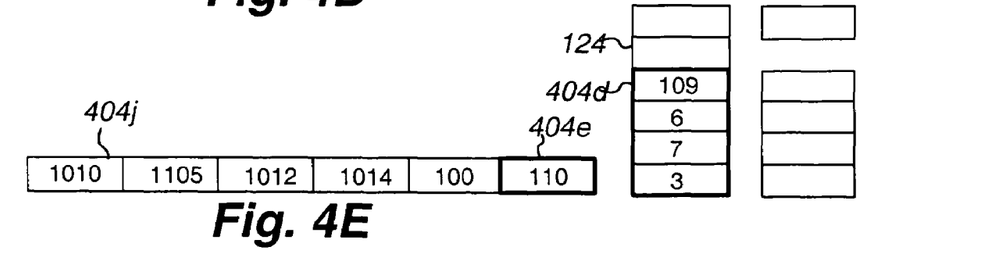

In FIG. 4E, the loading of the delta queue 124 is continued. A next task 404*j* waiting to be placed in an array 120 is also illustrated.

Figures 4F, 4G, 4H:
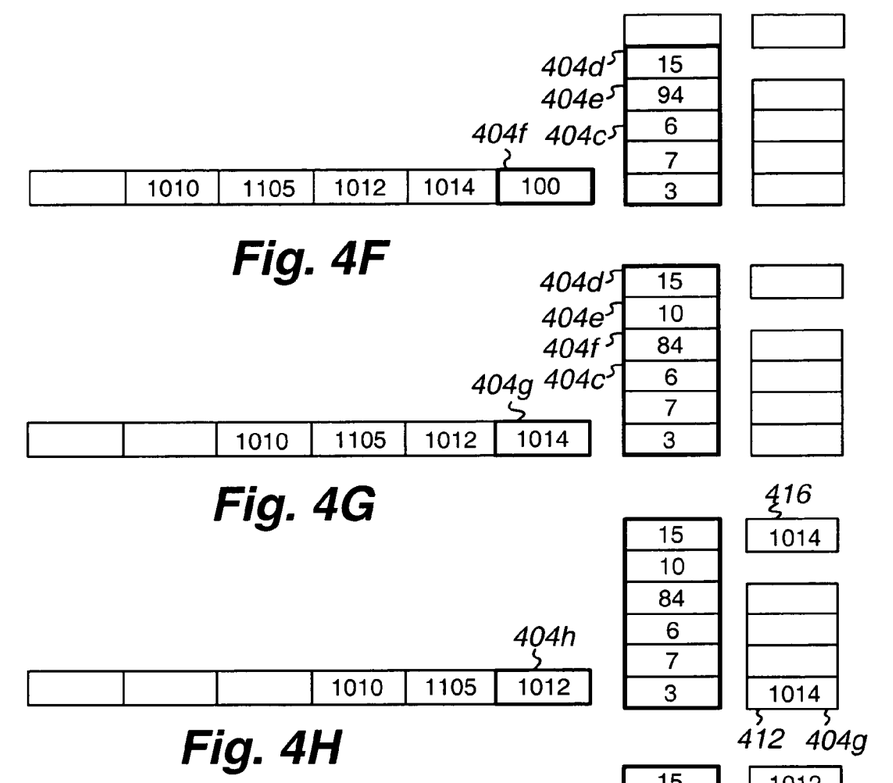

In FIG. 4F, it can be seen that the time value for task 404*e* is inserted between the time values for tasks 404*c* and 404*d*. This is part of the ordering of tasks that is performed in connection with the loading of a delta queue type primary scheduler queue 124. Likewise, in FIG. 4G, the time value for task 404*f* is inserted between task 404*c* and 404*e*. In FIG. 4H, the time value for task 404*g* is shown in a memory location 412 associated with the secondary scheduler queue 128. In particular, because the time value 1,014 of task 404*g* is greater than the threshold value for the delta queue 124, task 404*g* is placed in the secondary scheduler queue 128. In addition, FIG. 4H shows that the value associated with task 404*g* is also represented in the register 416.

Figures 4I, 4J:
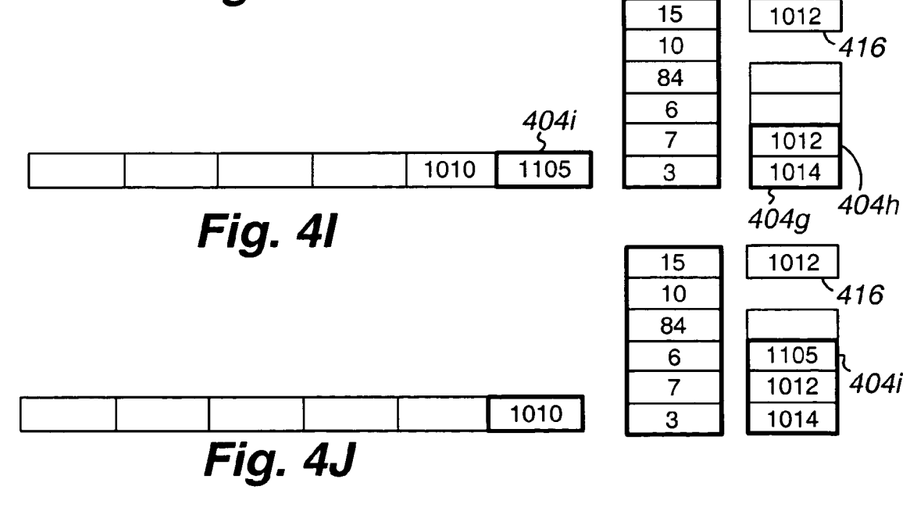

In FIG. 4I, the value 404*h* is shown after having been loaded into a second position in the secondary scheduler queue 128. Because the secondary scheduler queue 128, in the present example, comprises an array based scheduler, no reordering of the tasks 404 included in the secondary scheduler array 128 is performed. However, because the newly added task 404*h* has a lower time value than the task 404*g* that was first loaded into the secondary scheduler array 128, the value held by the register 416 is replaced with the value of the newly added task 404*h*. That is, the register 416 has the time value associated with the next scheduled task 404.

With reference now to FIG. 4J, the task 404*i* having an associated timer value of 1105 is shown loaded into the secondary scheduler array 128. Because the time value associated with this task 404*i* is greater than the other tasks in the queue 128, the register value 416 is unchanged.

Figures 5A, 5B:
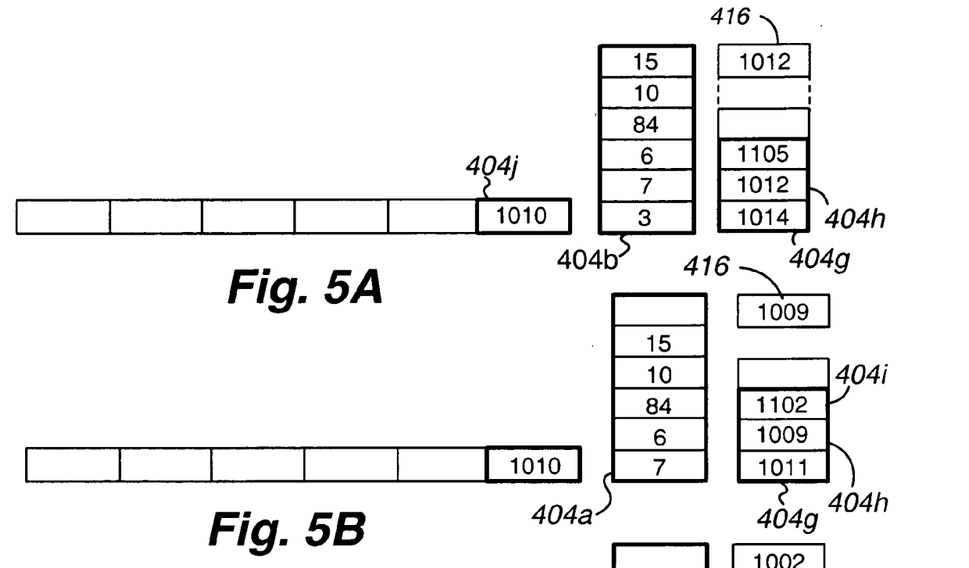
FIGS. 5A-5E illustrate aspects of the operation of a scheduler system in accordance with an embodiment of the present invention.

With reference now to FIG. 5A, tasks 404 held by the primary 124 and secondary 128 scheduler queues are shown at a first instant in time. In addition, a task 404*j* is shown in line to be loaded into the one of the queues 120. Accordingly, it can be appreciated that FIG. 5A represents the state of the queues 120 after initial loading of those queues, as illustrated in FIGS. 4A-4J.

FIG. 5B depicts the contents of the queues 120 after three units of time have elapsed as compared to the instant of time represented in FIG. 5A. In particular, it will be noted that task 404*b*, which had been held in the first memory location 408 within the primary scheduler queue 124 has been delivered to a resource 112, and therefore has been removed from the primary scheduler queue 124. Because the remaining tasks 404 in the primary scheduler queue 124 have been ordered by their scheduled times, delivery of the task 404*b* to a resource 112 does not require reordering of the queue 124. In addition, it can be appreciated that the scheduler system 108 did not need to scan the primary scheduler queue 124 to locate the next task to be delivered to a resource 112. Instead, the task 404 in the first position of the primary scheduler queue 124 could be taken when that task's associated timer expired. Furthermore, it can be appreciated that the tasks 404 remaining in the primary scheduler queue 124 did not need to have their associated timer values recalculated. FIG. 5B also illustrates a change in the secondary scheduler queue 128 as a result of the time that has elapsed between FIGS. 5A and 5B. In particular, the register 416 has been decremented to reflect the change in the absolute amount of time remaining until the next task within that queue is to be delivered to a resource 112.

Figures 5C, 5D:
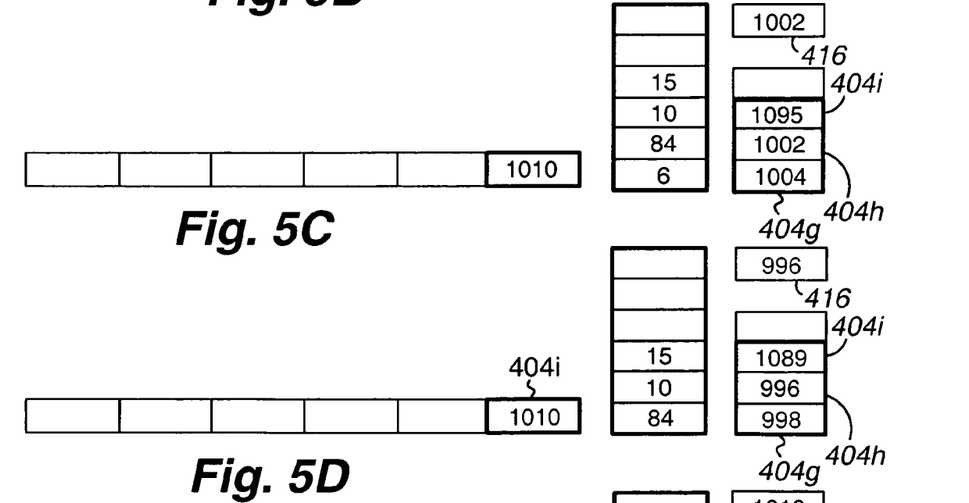

In FIG. 5C, the state of the queues 124 is shown after seven more units of time have elapsed. Accordingly, the next task 404*a* that was scheduled for delivery to a resource 112 (see FIG. 5B) has been delivered. In addition, the value held in the register 416 has been decremented, as have the values for the individual events 404 within the secondary scheduler queue 128.

In FIG. 5D, a further six units of time have elapsed. Accordingly, the next event 404*c* (see FIG. 5C) has been delivered to a resource 112, and the register value 416 and the values of the tasks within the secondary scheduler queue 128 have been decremented accordingly.

Figure 5E:
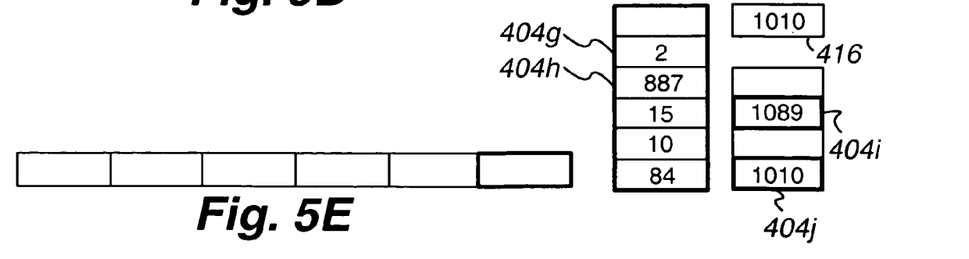

In FIG. 5E, the event 404*j* (see FIG. 5D) that had been waiting for placement in a queue 120 has been inserted into the secondary scheduler queue 128, because the timer value associated with the task 404*j* is greater than the threshold associated with the primary scheduler queue 124. Because that value is less than the remaining value in the secondary scheduler queue 128, the value for that task is represented in the register 416. FIG. 5E also illustrates the transfer of a task 404 from a secondary scheduler queue 128 to a primary scheduler queue 124. In particular, task 404*g* and 404*h* have been moved or promoted from the secondary scheduler queue 128 to the primary scheduler queue 124 because their associated time values have dropped beneath the threshold for the primary scheduler queue 124.

In accordance with another embodiment of the present invention, multiple secondary scheduler queues 128 are provided. As can be appreciated by one of skill in the art, each of the scheduler queues 120 may have a different threshold value. Furthermore, although the example given above discusses the use of a primary scheduler queue 124 comprising a delta queue, and a secondary scheduler queue 128 comprising an array based scheduler, the present invention is not so limited. For instance, a scheduler system 108 may be provided in which the all of the queues 120 are of the same type. By providing a number of queues 120, the number of tasks 404 that must be handled in connection with adding or removing tasks to or from a queue 120 is reduced, thereby reducing the load on the processor 208.

In accordance with another embodiment of the present invention, the time values associated with individual tasks 404 maintained in an array based scheduler queue 120 are not constantly updated as time elapses. Instead, only the value held within the register 416 needs to be decremented. When the value held within the register 416 is equal to or less than the threshold value for the next queue 120, the queue 120 can be scanned for the task 404 corresponding to the value held within the register (i.e., the task 404 with the lowest time value). Upon promotion of the next scheduled task to the next queue, the timers associated with the remaining tasks 404 can be adjusted accordingly.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computerized method for queuing tasks, comprising:
providing a first primary scheduler queue;
selecting a non-zero threshold time for said first primary scheduler queue;
providing a first secondary scheduler queue;
selecting a threshold time for said first secondary scheduler queue, wherein said threshold time for said first secondary scheduler queue is greater than said threshold time for said first primary scheduler queue;
receiving a first task;
determining a scheduled time for said first task, wherein said scheduled time is a time interval;
in response to said scheduled time for said first task not exceeding said threshold time for said first primary scheduler queue, placing said first task in said first primary scheduler queue;
determining whether said scheduled time associated with said first task or a scheduled time associated with another task in said first primary scheduler queue has expired;
in response to said scheduled time associated with said first task or said another task expiring, delivering said first task or said another task to a resource;
receiving a second task;
determining a scheduled time for said second task, wherein said scheduled time is a time interval;
in response to said scheduled time for said second task exceeding said threshold time for said first primary scheduler queue, placing said second task in said first secondary scheduler queue;
storing a record of a time to a next scheduled task stored in said first secondary scheduler queue;
decrementing said scheduled time associated with each of said scheduled tasks stored in said first secondary scheduler queue;
in response to said time to a next scheduled task stored in said first secondary scheduler queue being one of less than or equal to said threshold time for said first primary scheduler queue, scanning said first secondary scheduler queue for at least one task having a scheduled time at least one of less than said threshold time for said first primary scheduler queue and equal to said threshold time for said first primary scheduler queue; and moving said at least one task having a scheduled time at least one of less than said threshold time for said first primary scheduler queue and equal to said threshold time for said first primary scheduler queue from said first secondary scheduler queue to said first primary scheduler queue.

2. The method of claim 1, further comprising:
providing a second secondary scheduler queue;
receiving a third task;
determining a scheduled time for said third task; and
in response to said scheduled time for said third task exceeding a threshold time for said first secondary scheduler queue, placing said third task in said second secondary scheduler queue.

3. The method of claim 2, wherein said threshold time for said first secondary scheduler queue is less than a threshold time for said second secondary scheduler queue.

4. The method of claim 3, further comprising:
storing a record of a time to a next scheduled task stored in said second secondary scheduler queue;
in response to said time to a next scheduled task stored in said second secondary scheduler queue being one of less than said threshold time for said first secondary scheduler queue and equal to said threshold time for said first secondary scheduler queue, scanning said second secondary scheduler queue for at least one task having a scheduled time at least one of less than said threshold time for said first secondary scheduler queue and equal to said threshold time for said first secondary scheduler queue; and
moving said at least one task to said first secondary scheduler queue.

5. The method of claim 1, further comprising:
identifying in said first primary scheduler queue a task having a scheduled time equal to zero; and
providing said task having a scheduled time equal to zero to a resource.

6. The method of claim 5, further comprising:
providing a second primary scheduler queue; and
selecting a threshold time for said second primary scheduler queue, wherein said threshold time for said second primary scheduler queue is less than a threshold time for said first secondary scheduler queue.

7. The method of claim 1, wherein said first primary scheduler queue comprises a delta queue, and wherein said first secondary scheduler queue comprises a scheduling array.

8. An event scheduler device, comprising:
a processor;
memory, including:
a first primary scheduler queue;
a first secondary scheduler queue, wherein a first received task having a first scheduled time less than a first threshold is placed in said first primary scheduler queue, wherein said first scheduled time is a time interval, wherein said first threshold is greater than zero, wherein a second received task having a second scheduled time greater than said first threshold is placed in said first secondary queue, wherein said scheduled time of said second received task is maintained by a timer, wherein scheduled times of tasks placed in said first secondary queue are periodically decremented, wherein in response to said scheduled time value of said second received task as maintained by said timer dropping below said first threshold time said second received task is moved from said first secondary scheduler queue to said first primary scheduler queue; and a communication channel, wherein at least one of said first received task and said second received task is delivered to a resource from said first primary scheduler queue using said communication channel in response to at least one of said first scheduled time and said second scheduled time reaching a value of zero.

9. The device of claim 8, further comprising:
a second secondary scheduler queue.

10. The device of claim 8, wherein said first primary scheduler queue is a delta queue, and wherein said first secondary scheduler queue is a scheduling array.

11. The device of claim 8, further comprising:
a resource.

12. A computational component including instructions stored in memory that are executable by a processor for performing a method, the method comprising:
providing a primary queue and a secondary queue;
selecting a non-zero threshold time for said primary queue;
receiving a first task;
determining a scheduled time associated with said first task, wherein said scheduled time associated with said first task is a time interval;
in response to said scheduled time associated with said first task having a value that is less than a threshold time of said primary queue, placing said first task in said first primary queue;
in response to said scheduled time associated with said first task having a value that is greater than a threshold time of said primary queue, placing said first task in said secondary queue;
storing a time equal to a scheduled time of a task stored in said secondary queue having a next time to expire;
decrementing said scheduled time associated with said first task and any other task placed in said secondary queue;
in response to said stored time equaling a first value, scanning said secondary queue for said task having a next time to expire; and
moving said task having a next time to expire to said primary queue.

13. The method of claim 12, wherein said first value is equal to said threshold time of said primary queue.

14. The method of claim 12, wherein said providing a secondary queue further comprises providing a first secondary queue and a second secondary queue, the method further comprising:
selecting a threshold time for said first secondary queue;
selecting a threshold time for said second secondary queue; and
in response to said scheduled time associated with said first task having a value that is greater than a threshold time of said first secondary queue, placing said first task in said second secondary queue.

15. The method of claim 12, further comprising:
receiving an instruction to reschedule said first task;
locating said first task;
associating a new scheduled time with said first task;
in response to said new scheduled time associated with said first task having a value that is less than a threshold time of a said primary queue, placing said first task in said primary queue; and
in response to said new scheduled time associated with said first task having a value that is greater than a threshold time of said primary queue, placing said first task in a secondary queue.

16. A resource allocation system having a processor, comprising:
means for receiving events;
first means for queuing a plurality of events having a time for performing an associated task that is less than a non-zero threshold amount for said first means for queuing;
second means for queuing a plurality of events;
means for determining a time associated with an event, wherein said time associated with an event is a time interval, wherein a received event is placed in one of said first means for queuing and said second means for queuing based on said determined time associated with said event;
means for monitoring a time to expire of a next event in said first means for queuing a plurality of events to expire; and
means for moving an expired event from said first means for queuing to resource means;
means for decrementing said time associated with an event placed in said second means for queuing;
means for monitoring said time associated with a next event in said second means for queuing a plurality of events; and
means for moving an event having a time to expire of less than a first selected value from said second means for queuing to said first means for queuing.

* * * * *